(12) United States Patent
Matikainen et al.

(10) Patent No.: US 9,963,294 B2
(45) Date of Patent: May 8, 2018

(54) ARRANGEMENT AND METHOD IN A WAREHOUSE

(71) Applicant: Pesmel Oy, Kauhajoki (FI)

(72) Inventors: Jani Matikainen, Nummela (FI); Jouni Räisänen, Espoo (FI)

(73) Assignee: Pesmel Oy, Kauhajoki (FI)

( * ) Notice: Subject to any disclaimer, the term of this patent is extended or adjusted under 35 U.S.C. 154(b) by 0 days. days.

(21) Appl. No.: 15/312,083

(22) PCT Filed: May 20, 2015

(86) PCT No.: PCT/EP2015/061082
§ 371 (c)(1),
(2) Date: Nov. 17, 2016

(87) PCT Pub. No.: WO2015/177194
PCT Pub. Date: Nov. 26, 2015

(65) Prior Publication Data
US 2017/0081122 A1    Mar. 23, 2017

(30) Foreign Application Priority Data

May 23, 2014    (EP) ..................................... 14169646

(51) Int. Cl.
*B65G 1/137*    (2006.01)
*B65G 1/04*    (2006.01)

(52) U.S. Cl.
CPC ......... *B65G 1/1373* (2013.01); *B65G 1/0407* (2013.01); *B65G 2201/0232* (2013.01); *B65G 2201/0273* (2013.01)

(58) Field of Classification Search
CPC .. B65G 1/1373; B65G 1/0407; B65G 1/0492; B65G 1/065; B65G 2201/0232; B65G 2201/0273
See application file for complete search history.

(56) References Cited

U.S. PATENT DOCUMENTS 3,643,825 A * 2/1972 Zane, Jr. ................. B66F 9/183
                                                    414/607
4,829,749 A * 5/1989 Hiyama ............... B65G 1/1371
                                                    193/35 G (Continued)

FOREIGN PATENT DOCUMENTS

DE    20021440 U1    3/2001
EP    1180491 A1    2/2002

(Continued)

OTHER PUBLICATIONS

European Patent Office, European Search Report, Nov. 5, 2014, The Hague, Examiner Palais, Brieux.

(Continued)

*Primary Examiner* — Kaitlin S Joerger
(74) *Attorney, Agent, or Firm* — Berggren LLP (57) ABSTRACT

The invention relates to an arrangement for picking and sorting products in a warehouse, which arrangement comprises a main body (400) arranged to move in at least one direction, at least a first load handling unit (401) and a second load handling unit (402), arranged adjacent to each other in the main body for positioning the products to a storage position (201, 202; 203; 204) and removing the products from a storage position, means for producing location information of the products in the storage position, and a control unit for controlling the movements of the main body and the load handling units, based on the location information, for sorting the products to storage positions by type of products. The invention also relates to method for picking and sorting products in a warehouse.

9 Claims, 4 Drawing Sheets

(56) References Cited

U.S. PATENT DOCUMENTS

| | | | | |
|---|---|---|---|---|
| 4,836,386 | A * | 6/1989 | Smith | B07C 5/36 198/468.1 |
| 5,096,355 | A * | 3/1992 | Schroder | B65G 1/0492 414/273 |
| 5,286,157 | A * | 2/1994 | Vainio | B65G 1/0414 414/273 |
| 5,388,955 | A * | 2/1995 | Schroder | B65G 1/02 414/267 |
| 5,615,992 | A | 4/1997 | Proske et al. | |
| 6,315,513 | B1 * | 11/2001 | Harukawa | B65G 61/00 414/281 |
| 6,948,901 | B2 * | 9/2005 | Allemann | B65G 1/0407 414/279 |
| 8,006,824 | B2 * | 8/2011 | Wada | B65G 61/00 198/347.1 |
| 9,260,247 | B2 * | 2/2016 | Miller | B65G 15/58 |
| 2004/0091340 | A1 | 5/2004 | Allemann | |
| 2004/0151572 | A1 * | 8/2004 | Haimala | B65G 1/0492 414/807 |
| 2012/0027558 | A1 * | 2/2012 | Weeden | A47B 81/007 414/800 |
| 2016/0122078 | A1 * | 5/2016 | Clark | B65G 1/08 414/273 |

FOREIGN PATENT DOCUMENTS

| | | |
|---|---|---|
| EP | 1510476 A1 | 3/2005 |
| EP | 2248740 A1 | 11/2010 |
| JP | 2001270606 A | 10/2001 |
| WO | 2009150684 A1 | 12/2009 |
| WO | 2013150859 A1 | 10/2013 |

OTHER PUBLICATIONS

Sun Hong-Ying: The Application of Barcode Technology in Logistics and Warehouse Management, Education Technology and Computer Science, 2009. ETCS '09. First International Workshop on, IEEE, Piscataway, NJ, USA, Mar. 7, 2009, pp. 732-735, XP031459071, ISBN: 978-1-4244-3581-4.

Roodbergen K J et al.: A survey of literature on automated storage and retrieval systems, European Journal of Operational Research, Amsterdam, NL, vol. 194, No. 2, Apr. 16, 2009, pp. 343-362, XP025587626, ISSN: 0377-2217.

* cited by examiner

ARRANGEMENT AND METHOD IN A WAREHOUSE

PRIORITY

This application is a U.S national application of PCT-application PCT/EP2015/061082 filed on 05/20/2015 and claiming priority of European application number EP 14169646.8 filed on 05/23/2014, the contents of all of which are incorporated herein by reference.

FIELD OF THE INVENTION

The present invention relates to an arrangement and a method for picking products from a warehouse and sorting products in a warehouse.

BACKGROUND OF THE INVENTION

Some manufacturing facilities such as factories comprise a warehouse. The warehouse is typically used for storing products that have been manufactured before they have been sold to customers. For example in factories that either manufacture or process further paper in roll form, including cutting a paper roll into smaller rolls, a warehouse is used for storing paper rolls that are left over when a paper roll is cut into the ordered width. Indeed, typically the raw material is in the form of a paper roll of standard width and thus it is not always possible to cut the original roll into smaller rolls of only exactly the required width. The left over roll or rolls are then stored for future use, i.e. an order where such width is needed. For the time being, such left over rolls are stored on pallets or the like and the pallets, which usually comprise several types of rolls, are stored in the warehouse. Retrieving the rolls from the warehouse requires retrieving the pallet on which the rolls are stored and then manually handling the concerned roll or rolls in order to include them into the order. This is labour extensive and thus expensive. Moreover, manual handling of especially paper rolls increases the risk of damage to the rolls, which in turn increases the total cost as such a damaged roll would have to be disregarded.

When storing different kind of the tyres in a warehouse, there are similar kinds of problems. Typically, the tyres are stored on pallets or the like, one pallet comprises a number of tyres, typically one pallet comprises only one kind of the tyres. Picking the desired tyres for the order from the warehouse requires retrieving the pallet or several pallets on which the tyres are stored and manually or with separate robot picking the desired tyres and then returning the pallet(s) with remaining tyres back to the warehouse. Transporting of the pallet(s) to and from the warehouse is understandably very laborious and time-consuming, and the short-handed pallets returned back to the storage decrease the volumetric efficiency of the storage. Similar problems may occur in any other kind of factories and warehouses, especially those where the manufacturing process inevitably leads to products that are not according to the specific order.

OBJECT AND SUMMARY OF THE INVENTION

It is an object of the present invention to overcome at least part of the problems described above. Indeed, it is an object of the invention to provide a method and an arrangement useful in a warehouse which arrangement can pick the products from the warehouse in an automated manner. Another object of the invention is to provide a method and an arrangement in which the arrangement can have a dual function, in that it can be used for retrieving specific product or products from a warehouse and it can also be used, in between retrieval of the products, for sorting the products in the warehouse.

A typical arrangement for picking products from the warehouse and/or sorting products in a warehouse comprises a main body arranged to move in at least one direction, at least a first load handling unit and a second load handling unit, arranged adjacent to each other in the main body for positioning the products to a storage position and removing the products from a storage position, means for producing location information of the products in the storage position, and a control unit for controlling the movements of the main body and the load handling units, based on the location information, for sorting the products to storage positions and picking the products from storage position by type of products.

A typical warehouse comprises a plurality of storage positions and at least one product set arranged in one of the storage positions, the product set comprising, in an order, at least a first product and at least a second product adjacent to each other in a depth direction of the storage position, which first product is different from the second product as well as an arrangement as described above. A typical method for picking products from a warehouse comprises the steps wherein location of the products is identified and the products are picked, based on the location information, from storage positions by type of products, by at least a first load handling unit handling a first product and by a second load handling unit handling a second product so that first and second products can be picked from the same storage positions. In this method, the load handling units are arranged adjacent to each other in a main body, which main body is arranged to move in at least one direction.

DETAILED DESCRIPTION OF THE INVENTION

A typical arrangement for picking products from a warehouse and/or sorting products in a warehouse comprises a main body arranged to move in at least one direction, at least a first load handling unit and a second load handling unit, arranged adjacent to each other in the main body for positioning the products to a storage position and removing the products from a storage position, means for producing location information of the products in the storage position, and a control unit for controlling the movements of the main body and the load handling units, based on the location information, for picking products from storage positions and/or sorting the products to storage positions by type of products. Typically, the products are picked by at least a first load handling unit handling the first product and by a second load handling unit handling the second product so that first and second products are picked from the same storage positions.

Separate load handling units, at least a first load handling unit and a second load handling unit, make possible the picking of the products by type of products from one storage position, which comprise different type of the products in a depth direction of the storage position. The first load handling unit is arranged to pick desired first products, and the second load handling unit is arranged to remove non-desired second products temporarily out from the storage position and to return them to a storage position, which storage position can be same as previously or any other free storage position. The products can be picked from one, two or more storage positions. The products for the order can be picked from the warehouse by means of the method and arrangement according to the invention so that only the products of the order are conveyed out from the warehouse. If the sorting of the product is not needed, both of the handling units can be used for picking the products from the storage positions.

The arrangement thus comprises at least two load handling units which are arranged in one main body. The arrangement may comprise also further main bodies (such as two, three or four main bodies) with load handling units as well as more than two load handling units in one main body, such as three or four load handling units in one main body. The arrangement can thus be easily up scaled. In a most typical arrangement there is however one main body having two load handling units.

The main body is arranged to move in at least one direction but preferably in at least two directions, which are preferably opposite directions (such as back and forth). The main body can also be arranged to move in two more directions, such as up and down. Typically these additional movement directions are perpendicular to the first and optional second movement direction. For example, in a high bay warehouse, where the storage is organised in shelves, i.e. there are storage positions that are next to one another and on top of one another, the main body is preferably arranged to move in four directions such that it can be placed in front of all storage positions. The main body can also be arranged to move in more than four directions if need be. The arrangement preferably also comprises means for moving the main body, such as a track or a rail system and a motor connected to the main body.

The storage positions are such that at least two products and preferably more than one product can be placed in each storage position. The products can be placed into the storage positions for example one next to another horizontally or one on top of each other. Most preferably the products can be positioned next to another horizontally in such a manner that only one product is visible from each storage position. The storage positions can be for example arranged as a shelf having a height and a width as well as depth. In such a configuration, the products can be arranged next to each other horizontally in the depth direction. The storage positions are preferably accessible through only one side, which is designated as the output of the storage position. The output of the storage position is thus the location from which the load handling units can enter the storage position for picking up or depositing one or more products.

The load handling units are arranged adjacent to each other, such as next to each other or on top of each other. They are both arranged to more in two opposite directions. The movement directions of the first load handling unit are typically parallel to the movement directions of the second load handling unit. The load handling units are arranged in such a manner that their distance one from the other remains essentially constant. The movement directions of the load handling units are typically different from the movement direction(s) of the main body. In a typical embodiment of the invention, the load handling units are arranged to move in a depth direction of the storage positions. Moreover, the load handling units move in two opposite directions but do not typically move in a third direction with respect to each other (i.e. they may move in a third direction but only together with the main body, when the main body moves).

The load handling units preferably move in a coordinated manner. The load handling units are arranged to position products to a storage position and to remove products from a storage position. The load handling units may also be arranged to position products within the storage position, for example to move the products closer to the output of the storage position or further away from it. The movements of the load handling units are thus such that the main body can move freely between the storage positions when the load handling units are in their retracted position and the protruding position (and movement) of the load handling units allows them to either remove from or position products to a storage position.

The warehouse comprises at least two storage positions, typically more than two storage positions, such as 5, 10, 15, 20, 30, 40, 50 or even 100 or more storage positions. The method and arrangement according to the invention is suitable for handling any kind of the products. The products handled by the present arrangement can be single products such as one paper roll, coil or tyre or one box. They can also be product units comprising several single products, such as a pile of boxes or a pallet with two or three (or more) rolls or a set of tyres, attached together. For example, sometimes rolls may be too thin to be handled one by one, and instead, need to be handled and stored by packs of two, three or four rolls. Tyres are typically stored in the sets comprising two or four tyres.

According to an embodiment of the invention, the cylindrical products, such as paper rolls, coils or tyres, are handled in a horizontal position in a warehouse. For example, when the tyres are stored in a horizontal position, they need less space compared to the storing in vertical stacks. A horizontal position refers to a longitudinal direction of the cylindrical product which is the direction of the axis, i.e. axial direction of the cylindrical product.

The means for producing location information of the products allows also the recording of information attached to the products. This information can be for example in the form of a bar code, an RFID tag or a QR code attached to the product(s) entering the warehouse. The means for producing the location information can be for example a combination of at least one reader unit and means for storing and handling information. The reader unit reads the information on the products and then the information of the product type is stored and combined with the information of where the product is positioned in the warehouse (i.e. its storage position). The means for storing and handling information is typically a computer equipped with suitable software.

The control unit for controlling the movements of the main body and the load handling units, based on the location information, for sorting the products to storage positions by type of products is typically a computer and an associated program. The control unit reads the location information and controls the movements of the main body and the load handling units so that the products are sorted. The arrangement may also comprise a second control unit used for controlling the movements of the main body and the load handling units for retrieving the required products based on an order. Preferably however, this part is also done by the same control unit that controls the sorting of the products. The arrangement can for example be programmed such that retrieving the correct products for an order is prioritised and when there are no pending orders, the arrangement works on its own to sort the products in the warehouse.

According to a preferred embodiment, the control unit is also designed to control the movements for picking up new products entering the warehouse, and for storing them into one or more storage positions. The order for this can be received for example from production or from an intermediated step between the production and the warehouse. The order can also be received for example from a packing and/or shipping station of the warehouse.

The load handling units, when they are designed to handle products in roll form, can have a similar structure to that disclosed in EP 1510476. They may thus have supporting surfaces arranged on supporting elements that are movable along linear motion elements, such as rail or bar elements. They typically also comprise a lifting element used for lifting and/or lowering the products to and from the storage positions. For products in any other form, any load handling units known as such can be used.

The load handling units can also be operable on both sides of the main body, such that one main body is sufficient for two shelves, for example. This can be achieved for example when the main body is arranged to move in between two parallel storage shelves and the load handling units can move on both sides of the main body, along the two opposite directions.

The arrangement preferably also comprises means for transferring the main body, such as a track or a rail system and a motor connected to the main body.

According to one embodiment, the main body is a stacker crane. According to another embodiment, the load handling units are parallel telescopic fork units. These embodiments are especially suitable for high bay warehouses.

The invention relates also to a method for picking and sorting products in a warehouse, the warehouse comprising a plurality of storage positions and at least one product set arranged in one of the storage positions, the product set comprising, in an order, at least a first product and at least a second product adjacent to each other, which first product is different from the second product. In a typical method location of the products is identified and the products are sorted, based on the location information, to storage positions by type of products, by at least a first load handling unit handling the first product and by a second load handling unit handling the second product, and the load handling units are arranged adjacent to each other in a main body, which main body is arranged to move in at least one direction.

Most typically, the warehouse comprises a large number of different products and a large number of each product type. There are also several possible ways of sorting the products, but in essence, the main body and the load handling units are arranged to move in such a manner that all products are sorted by type of products. The movements of the main body are such that the relevant load handling unit is facing the relevant storage position and the movements of the load handling units are such that they either remove product(s) from or position product(s) to appropriate storage position(s).

The method can for example comprise the following steps, in a warehouse where at least a first product set having at least two different products (or several products of at least two types) are arranged in at least one storage position (the first storage position), but the products are not yet in an order by type of products:

a) removing at least one product of a first type of products from the first product set in a first storage position, by using a first load handling unit, b) removing at least one product of a second type of products from the first product set in the first storage position, by using a second load handling unit, c) arranging the first type of product or products to the first or to a second storage position, d) removing all accessible products that are different from a second type of products from a second product set in a third storage position, by using the first load handling unit, e) removing at least one product of the second type of products from the second product set in the third storage position, by using the second load handling unit (which second load handling unit already carries products of second type), f) arranging the products from the first handling unit to the third or to a fourth storage position, g) repeating steps d to f with the third storage position if there remains products of the second type and then with a fifth storage position comprising second type of products in order to remove the second type of products from said storage position, h) repeating the above steps until the second handling unit comprises a number of second type of products large enough to fill a storage position or until all second type of products are removed from the product sets, whichever is achieved first, i) arranging the second type of products into a storage position, which storage position may be empty or already comprise products of the second type, j) repeating the steps a to i until all of the products of the warehouse are sorted by type of product into storage positions.

Indeed, a typical warehouse comprises several storage positions of which some may be empty and some may comprise different sets of different products, and the products may be in any random order in each set. The load handling units typically remove all accessible adjacent products of same type at the same time, provided naturally that there is sufficient room on the load handling unit to do so. By accessible products are meant products which are directly facing the load handling unit, i.e. are not arranged behind any other type of products when seen from the load handling unit.

The method may also comprise, before step a) above, the step of removing at least one product of the second type of products from the first set of products in a first storage position, by using a first handling unit, and arranging said at least one product of second type to an empty storage position.

For example, if there are two sets of products each comprising products of the type A and B in an order, for example in a first storage position products A1, A2, B1, A3 and in a second storage position products B2, A4, B3, B4, then the first load handling unit can first remove the products A1 and A2 from the first storage position. Then the second load handling unit can remove product B2 from the second storage position and then product B1 from the first storage position. The main body moves accordingly to allow the load handling units to access the respective storage positions. The first load handling unit is now carrying products A1 and A2 and the second load handling unit is carrying products B2 and B1. The first load handling unit can now return products A1 and A2 to the first storage position, remove product A4 from the second storage position and position it to the first storage position, whereby all products of type A are arranged in one storage position. Then the second load handling unit positions products B2 and B1 to the second storage position and thus all the products are sorted by type of products. When the next order comes in that requires either type of products A or B, then one of the load handling units will pick up the required number of products from the relevant storage position.

The method according to an embodiment of the invention for picking the products for an order from a warehouse can comprise the following steps, when at least a first product set having at least two different products are arranged in at least one storage position (the first storage position) in a warehouse, but the products are not yet in an order by type of products:

a) picking at least one product of a first type of products from the first product set in a first storage position, by using a first load handling unit,
b) removing at least one product of a second type of products from the first product set in the first storage position, by using a second load handling unit,
c) picking at least one product of a first type of products from the first product set in a first storage position, by using a first load handling unit,
d) returning the second products to a storage position after the first products are picked to the first load handling unit.
e) repeating the above steps until all products by the order are picked.

The products can be conveyed directly out from the warehouse after they have picked from the storage positions to the main body. Alternatively, the products can be stored temporarily in the main body, when the products of two or more orders can be conveyed at same time out from the warehouse. This improves energy efficiency of the warehouse since back and forth movements of the main body can be reduced; also the remarkable time saving is achieved. Thus, the main body according to an embodiment of the invention comprises at least one temporary storage position for the products picked up, which storage position is located so that it does not disturb the picking of other product sets. The main body can comprise one, two or more temporary storage positions.

According to one embodiment, the main body is a stacker crane which is arranged to move up and down along a vertical mast. The stacker crane can comprise one or multiple level arrangement suitable for temporary storing of the products or product sets, which arrangement is arranged to move independently along the vertical mast or it is arranged to move with the lifting carriage of the stacker crane. The arrangement for temporary storing can be situated in one or both sides of the mast. According to another embodiment of the invention, the lifting carriage of the stacker crane can be used as temporary storage. The aim of the temporary storing is that the capacity of the stacker crane can be increased since more than one loading or unloading tasks can be performed at same time.

As a person skilled in the art is readily able to assess, there are several alternative ways of organising the sorting and the sorting can also easily be up scaled for a warehouse comprising several different types of products. Should an order come in during the sorting of the products, the arrangement may interrupt the sorting by emptying its load handling units (or at least one of them, depending on the nature of the order) to one or more storage positions and pick up the products required for the order. As the location information is constantly updated in the system, the arrangement can then simply return to its task of sorting once the order has been fulfilled. The arrangement may of course comprise a second main body comprising one or more load handling units that are used for picking up products according to an order. Similarly, if the arrangement receives information that there is a new set of products waiting to be added to the storage and sorted, it may temporarily stop its sorting process to pick up the new set and to position it to a storage position.

A typical warehouse comprises a plurality of storage positions and at least one product set arranged in one of the storage positions, the product set comprising, in an order, at least a first product and at least a second product adjacent to each other, which first product is different from the second product as well as an arrangement as described above.

All the embodiments and details described above in connection with the arrangement and the method apply mutatis mutandis to the warehouse.

In this description, the term comprising is used as an open term. The claims below define the scope of the invention, but the reference numbers are not to be construed as limiting the claims. Some embodiments of the invention will now be described in more detail with reference to the enclosed drawings. Same reference numbers are used in all Figures.

DETAILED DESCRIPTION OF THE DRAWINGS

Figure 1:
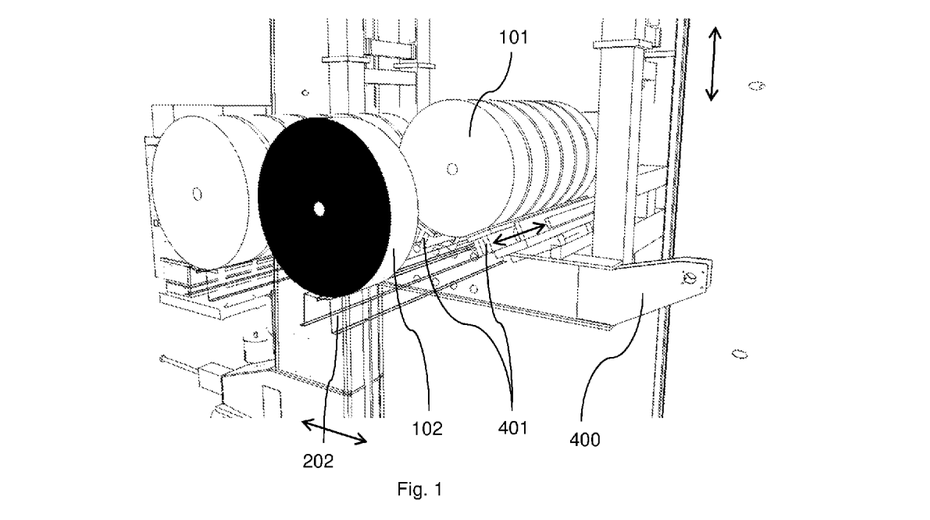
FIG. 1 illustrates an arrangement according to an embodiment of the invention.

FIG. 1 illustrates an arrangement according to an embodiment of the invention. The main body 400 is a stacker crane in this embodiment and two parallel telescopic fork units are arranged in the main body as load handling units (of which one is denoted with the reference number 401). Two different types of rolls 101 and 102 are arranged on the load handling units. The Figure also shows the load handling units in their extended positions, i.e. where the fork units are extended to storage positions, as can be seen in FIG. 2 below.

FIGS. 2 to 6 schematically illustrate some steps of a method according to an embodiment. In this method, two different types of rolls 101 and 102 are arranged in a warehouse in a random manner. The warehouse comprises several storage positions 201, 202, 203, 204 and so on in a storage shelf 300. The main body 400 has two load handling units 401 and 402 arranged next to one another.

Figure 2:
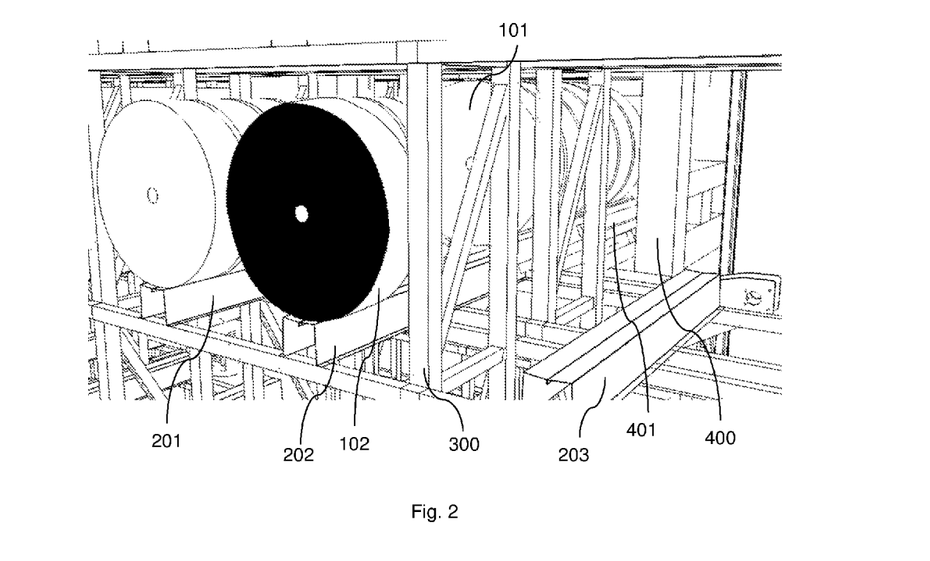
FIG. 2 schematically illustrates one step of a method according to another embodiment of the present invention.
Figure 3:
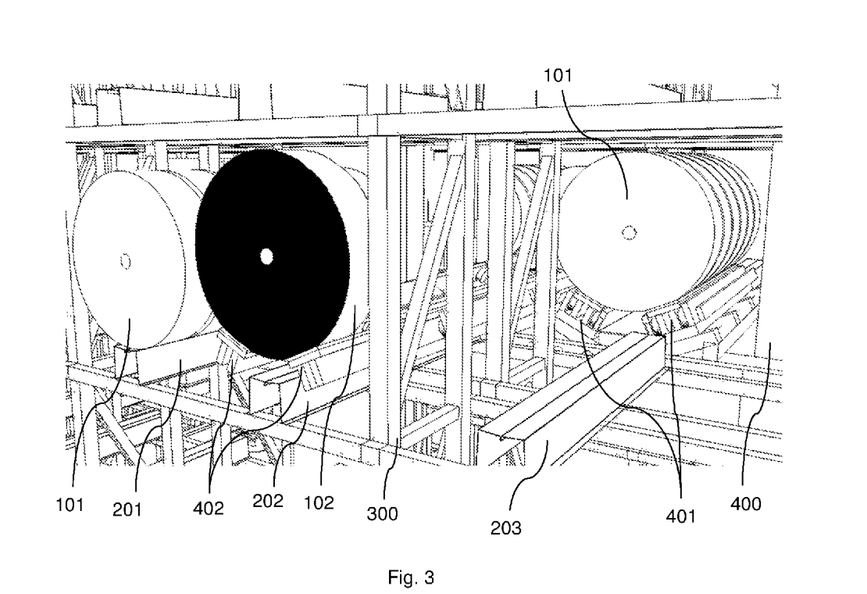
FIG. 3 schematically illustrates a further step of a method according to another embodiment of the present invention.
Figure 4:
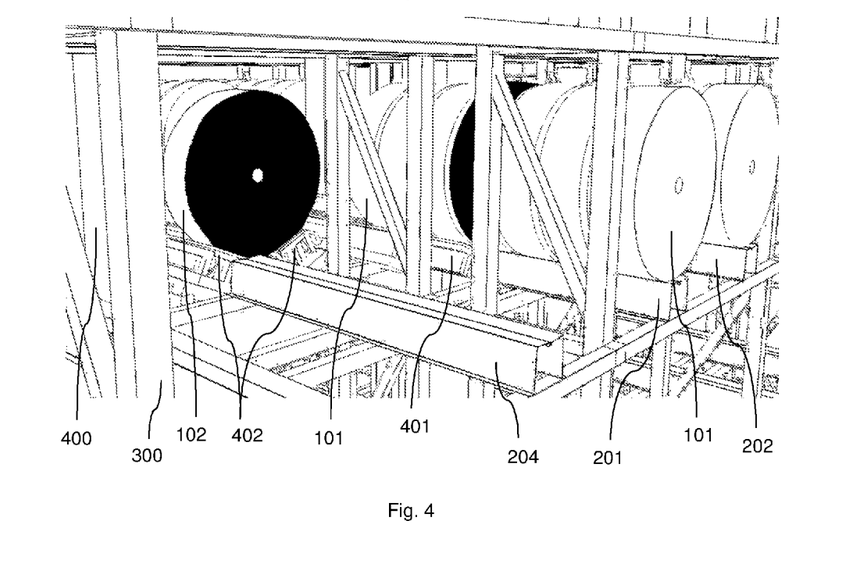
FIG. 4 schematically illustrates a yet further step of a method according to another embodiment of the present invention.

FIG. 2 shows one step of the method, in which the first load handling unit 401 has picked up six rolls of type 101 from the second storage position 202 and is retracting back to the main body 400. In FIG. 3, the main body has moved such that the second load handling unit 402 is facing the second storage position 202 and has picked up one roll of the second type 102. In the step shown in FIG. 4, after the first load handling unit 401 has re-positioned the rolls of first type 101 back to the storage position 202, the main body has again moved and the first load handling unit 401 is facing the first storage position 201 and picking up three rolls of the first type 101.

Figure 5:
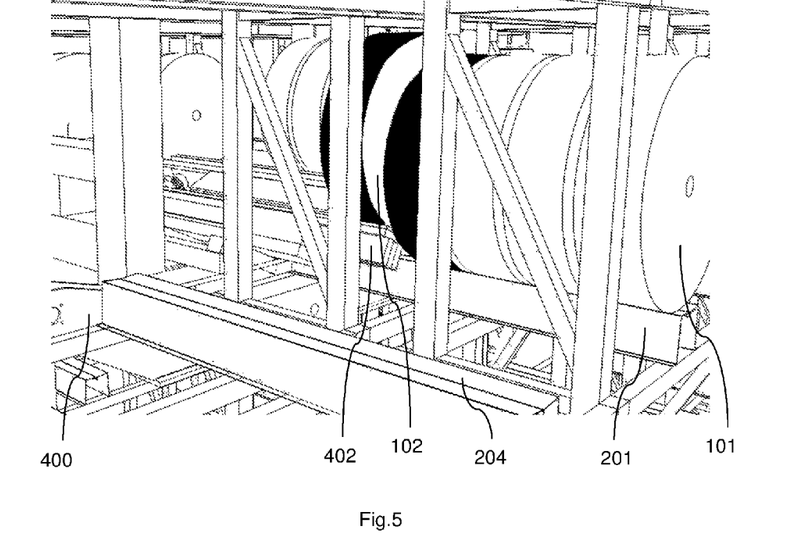
FIG. 5 schematically illustrates a still further step of a method according to another embodiment of the present invention.
Figure 6:
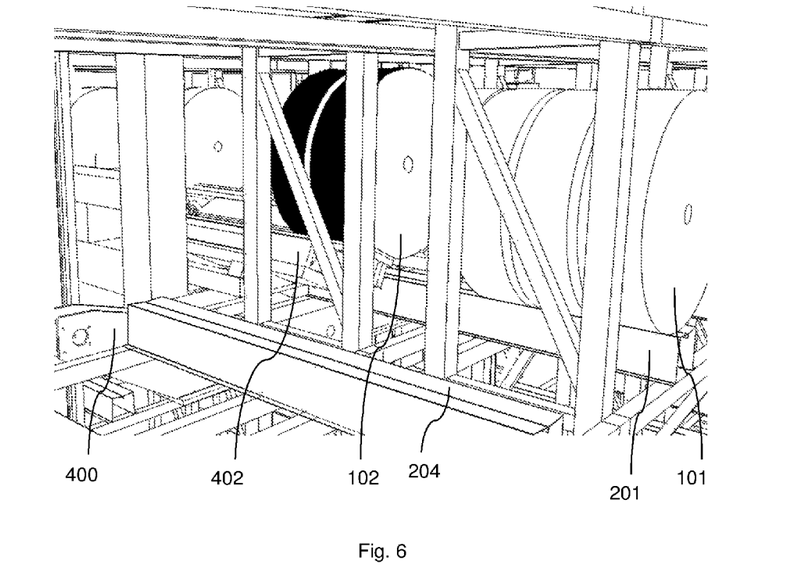
FIG. 6 schematically illustrates another, further step of a method according to another embodiment of the present invention.

In the step shown in FIG. 5, the second load handling unit 402 is facing the first storage position 201 to firstly position the roll of second type 102, that it picked up earlier from the second storage position, next to an identical roll, and then to pick up both rolls of second type 102, as shown in FIG. 6. These two rolls can then be positioned for example in the fourth storage position 204.

Figure 7:
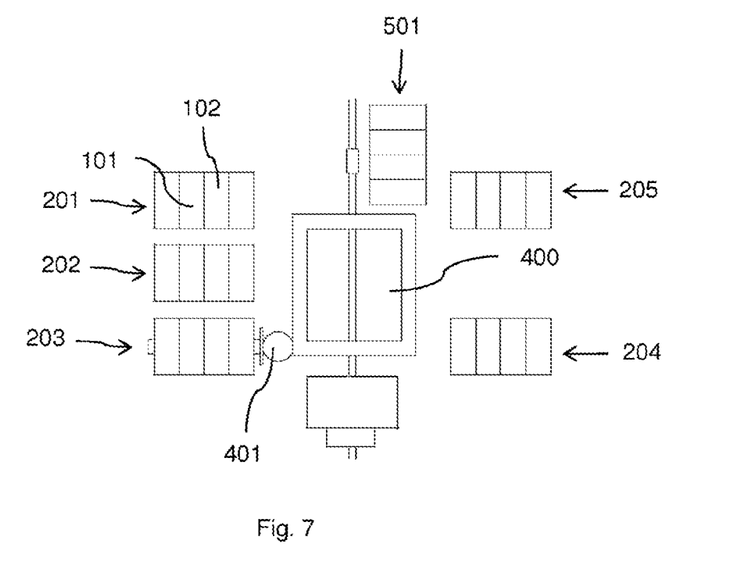
FIGS. 7 and 8
  illustrate a temporary storage according to an embodiment of the invention.
Figure 8:
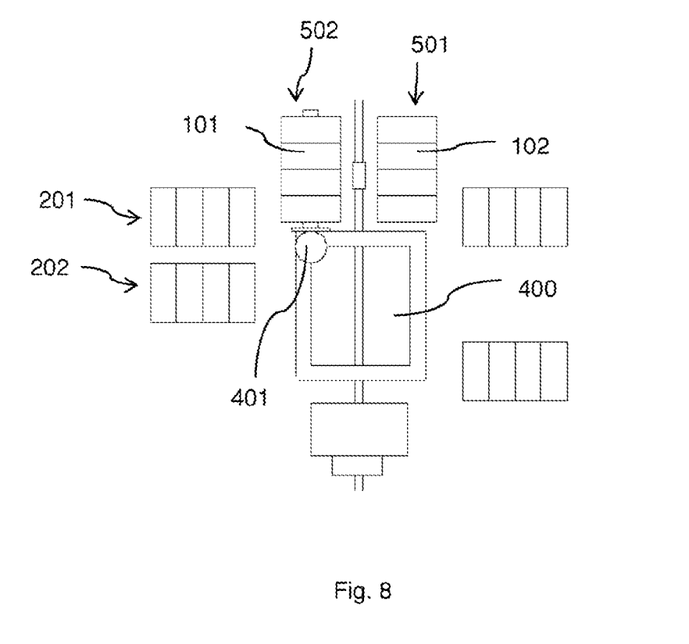

FIGS. 7 and 8 illustrate a temporary storage according to the invention. In the step shown in FIG. 7, the first load handling unit 401 has picked up products 101, 102 from the storage position 203 to the stacker crane 400 and then these products are transferred to the temporary storage position 502 as shown in FIG. 8. The stacker crane 400 can comprise one or more temporary storage positions 501, 502 for the products picked up. The load handling unit 401 can pick up products or product sets from storage positions 201, 202, 203, 204, 205 which are arranged on both sides of the stacker crane 400. From the temporary storage positions 501, 502 product sets comprising products 101, 102 can be conveyed at same time out from the warehouse by using stacker crane 400.

The invention claimed is:

1. A method for picking products from a warehouse, the warehouse comprising
    a plurality of storage positions organised in shelves, and
    at least one product set arranged in one of the storage positions, the product set comprising, in an order, at least one first cylindrical product and at least one second cylindrical product adjacent to each other horizontally in a depth direction of the storage position,
    wherein the at least one first and the at least one second cylindrical product are tyres or sets of tyres, and in which method
    location of the products is identified and
    the products are picked, based on the identified location information, from storage positions by type of products, by at least one first load handling unit handling the at least one first cylindrical product wherein the at least one first cylindrical product is a desired product and the at least one first load handling unit picks the desired product and by at least one second load handling unit handling the at least one second cylindrical product wherein the at least one second cylindrical product is a non-desired product and the at least one second load handling unit removes the non-desired product temporarily out from the storage position and returns them to a storage position
    and the at least one first and the at least one second cylindrical products are picked from the same storage positions, and which load handling units are parallel telescopic fork units arranged adjacent to each other in a main body, which main body is a stacker crane arranged to move in at least one direction, and the load handling units handle cylindrical product in the axial direction of the cylindrical product.

2. An arrangement for picking products from a warehouse comprising
    a plurality of storage positions arranged in shelves,
    a plurality of product sets arranged in at least some of the storage positions, each product set comprising, in an order, at least one first cylindrical product and at least one second cylindrical product adjacent to each other horizontally in a depth direction of the storage position, the at least one first and the at least one second cylindrical product are tyres or sets of tyres,
    wherein the arrangement comprises
    a main body arranged to move in at least one direction, which main body is a stacker crane,
    at least one first load handling unit and at least one second load handling unit, arranged adjacent to each other in the main body for positioning the cylindrical products to a storage position and removing the cylindrical products from a storage position, which load handling units are parallel telescopic fork units and arranged to handle cylindrical products in an axial direction of the cylindrical product,
    means for producing location information of the products in the storage position, and
    a control unit for controlling the movements of the main body and the load handling units, based on the location information, for picking products from the storage positions by type of products, by the at least one first load handling unit handling the at least one first cylindrical product wherein the at least one first cylindrical product is a desired product and the at least one first load handling unit picks the desired product and by the at least one second load handling unit handling the at least one second cylindrical product wherein the at least one second cylindrical product is a non-desired product and the at least one second load handling unit removes the non-desired product temporarily out from the storage position and returns them to a storage position and the at least one first and the at least one second cylindrical products are picked from the same storage positions.

3. The arrangement according to claim 2, wherein the means for producing location information is a combination of at least one reader unit and means for storing and handling information.

4. The arrangement according to claim 3, wherein at least one of the reader units is arranged to identify the products entering the warehouse.

5. The arrangement according to claim 2, wherein load handling unit comprises supporting surfaces arranged on supporting elements arranged movable along linear motion elements, and a lifting element.

6. The arrangement according to claim 2, wherein the main body is arranged to move in four directions, and comprises means for movement.

7. The arrangement according to claim 2, wherein the main body comprises at least one temporary storage position for the products picked up.

8. The method according to claim 1, wherein the main body is arranged to move in four directions.

9. The method according to claim 8, wherein the at least one first and the second load handling units are arranged to move in two opposite directions.

* * * * *